United States Patent
Flores et al.

(10) Patent No.: US 8,022,809 B2
(45) Date of Patent: Sep. 20, 2011

(54) INVENTORY TAKING SYSTEM

(75) Inventors: Eduardo Ruiz Esparza Flores, San Pedro Garza Garcia (MX); Jose Adalberto Teran Matus, San Pedro Garza Garcia (MX); Rafael Guillermo Ramos Elizondo, Monterrey (MX)

(73) Assignee: RFID Mexico, S.A. De C.V., Nuevo Leon (MX)

( * ) Notice: Subject to any disclaimer, the term of this patent is extended or adjusted under 35 U.S.C. 154(b) by 1181 days.

(21) Appl. No.: 11/591,546

(22) Filed: Nov. 2, 2006

(65) Prior Publication Data

US 2008/0106377 A1  May 8, 2008

(51) Int. Cl.
*G05B 19/00* (2006.01)
*G06F 7/00* (2006.01)
*H04B 1/00* (2006.01)
*H04Q 1/00* (2006.01)

(52) U.S. Cl. ............ 340/5.92; 340/10.1; 340/10.2; 340/10.5; 340/572.1; 340/574; 235/385

(58) Field of Classification Search .......... 340/5.92, 340/10.1–10.5, 825.49, 825.36, 572, 573, 340/574; 705/28, 22, 46; 235/385; 280/79.2, 280/79.3; 180/273

See application file for complete search history.

(56) References Cited

U.S. PATENT DOCUMENTS

| | | | | |
|---|---|---|---|---|
| 4,862,160 A * | 8/1989 | Ekchian et al. | ............ | 340/10.32 |
| 5,505,473 A * | 4/1996 | Radcliffe | ............ | 280/79.2 |
| 5,646,616 A * | 7/1997 | Komatsu | ............ | 340/988 |
| 5,669,748 A * | 9/1997 | Knudsen, Jr. | ............ | 414/273 |
| 5,689,238 A * | 11/1997 | Cannon et al. | ............ | 340/572.1 |
| 6,496,806 B1 * | 12/2002 | Horwitz et al. | ............ | 705/28 |
| 6,714,121 B1 * | 3/2004 | Moore | ............ | 340/10.3 |
| 6,870,464 B2 * | 3/2005 | Okamura | ............ | 340/10.51 |
| 7,023,344 B2 * | 4/2006 | Schaper | ............ | 340/572.4 |
| 7,132,945 B2 * | 11/2006 | Dunlap, Jr. | ............ | 340/572.1 |
| 7,154,395 B2 * | 12/2006 | Raskar et al. | ............ | 340/572.4 |
| 7,336,177 B2 * | 2/2008 | Onderko et al. | ............ | 340/572.1 |
| 7,484,662 B2 * | 2/2009 | Schmidtberg et al. | ............ | 235/385 |
| 7,656,296 B2 * | 2/2010 | Runyon et al. | ............ | 340/572.7 |
| 7,683,760 B2 * | 3/2010 | Ehrman et al. | ............ | 340/10.1 |

* cited by examiner

*Primary Examiner* — Brian A. Zimmerman
*Assistant Examiner* — Nam V Nguyen
(74) *Attorney, Agent, or Firm* — Young & Thompson

(57) ABSTRACT

A system which is able to take inventory of products stored in high rise racks and immediately provide the inventory information to an information system for immediate processing and which makes use of remote electronic identification means for each product, box, etc. and each row of a correspondent rack, thus allowing the system to read great amounts of information at once.

3 Claims, 2 Drawing Sheets

INVENTORY TAKING SYSTEM

BACKGROUND OF THE INVENTION

A. Field of the Invention

The present invention is related to systems for taking physical inventory and more particularly to an inventory taking system for automatically recollecting and processing information related to the inventory of a warehouse.

B. Description of the Related Art

The duty of taking inventory and processing all the related information on medium and big warehouses is a big challenge for the company mainly due to the big quantity of products stored therein and to the physical characteristics of the warehouses, in which the products are stored in high rise racks.

Although there have been developed electronic systems for controlling inventory information, said information rely on manually taking the inventory which is not always accurate, and sometimes the information generated by said systems do not accurately reflect the real existences and quantities of products in the warehouse, causing problems and delays in the delivery of products, and consequently, sometimes it is necessary to manually take the inventory to correct the system information.

In some manufacturing industries it is vital to the production processes to have the last accurate and real information about the number of thousands of pieces currently on inventory, which sometimes is very difficult and takes a long time, and therefore, the information rarely reflects the current inventory status.

Therefore, it would be highly desirable to have a system able to provide immediate and current information about the inventory status without having to manually take the inventory, which takes a long time and is not always accurate.

In view of the above referred problems, applicants developed an automated system for physically take inventory and immediately provide accurate and current information about the inventory of products or items.

Applicant's system is able to quickly take the inventory of products stored in high rise racks and immediately provide the inventory information to an information system for immediate processing.

In order to achieve such processing velocity, applicant's system makes use of remote electronic identification means for each product, box, etc. and each storing cell of a correspondent rack, thus allowing the system to read great amounts of information at once.

Applicant's system comprises: at least one remote electronic identification means reading means; moving means for the inventory taking device; control means for controlling the components of the inventory taking device receiving information from the remote identification means and for sending said information to the electronic information and control system; and electronic information transmission means connected to the control means, having wireless information transmission means, receiving the information obtained by the control means and wireless sending said information to the electronic information and control system.

Thanks to applicant's system it is possible to have the last accurate information about the inventory of products or items, no matter how big or extended is the warehouse, thus avoiding delays in the production processes and losses of money.

SUMMARY OF THE INVENTION

It is therefore a main object of the present invention to provide an inventory taking system which provides accurate and current information about the inventory of products or items.

It is another object of the present invention to provide an inventory taking system of the above referred nature, which is able to quickly take the inventory of products stored in high rise racks and immediately provide the inventory information to an information system for immediate processing.

It is another main object of the present invention to provide an inventory taking system, which makes use of remote electronic identification means for each product, box, etc. and each row of a correspondent rack, thus allowing the system to read great amounts of information at once.

It is still another object of the present invention to provide an inventory taking system by which it is possible to have the last accurate information about the inventory, no matter how big or extended is the warehouse, thus avoiding delays in the production processes and losses of money.

These and other objects and advantages of the inventory taking system of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
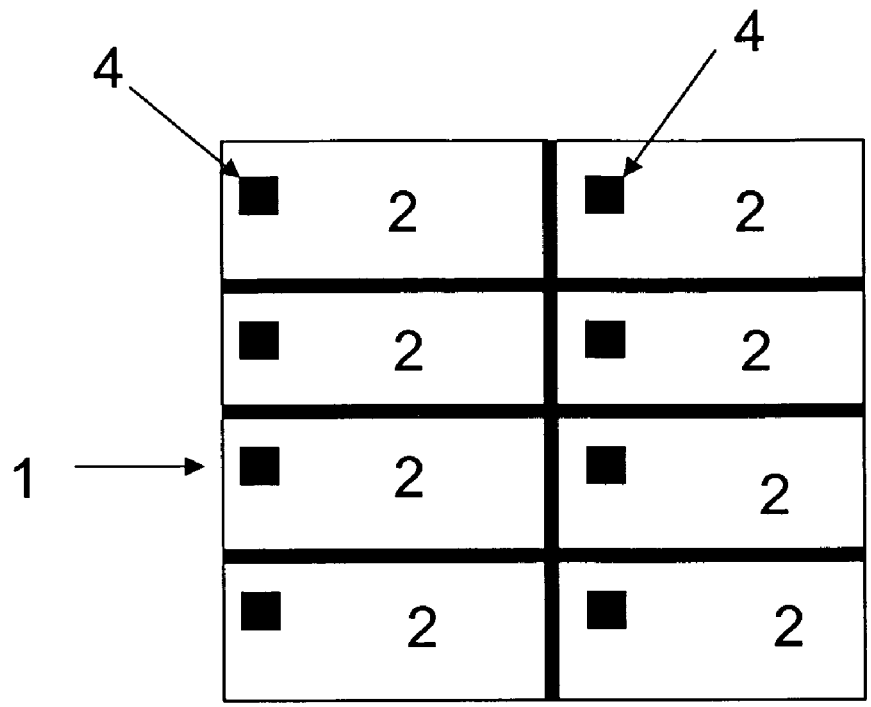
FIG. 1 is a diagram of the inventory taking system of the present invention showing two racks each having a plurality of cells each including electronic identification means.
Figure 1:
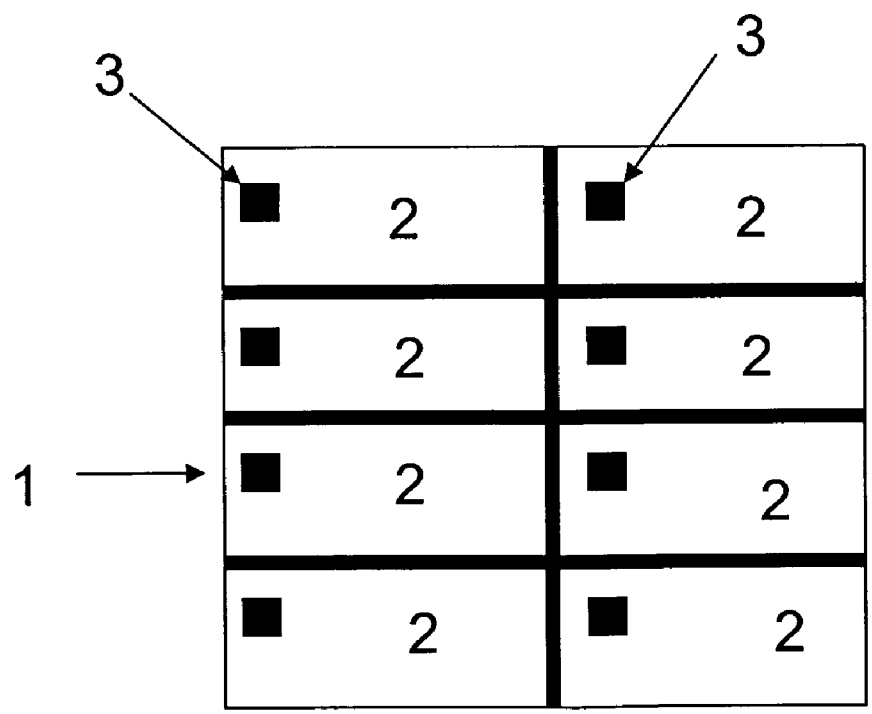

The inventory taking system of the present invention will be described making reference to a preferred embodiment thereof and to the accompanying drawings.

In a preferred embodiment, the inventory taking system of the present invention is used at a warehouse having a plurality of racks 1 each having a plurality of rows which may be vertically divided forming cells 2 each including a front and a bottom corresponding to the width of the rack, wherein the products 3 always move from the bottom to the front. Therefore the whole rack is divided in a plurality of cells having a distribution of A×B, wherein A comprise the number of vertical cells and B comprise the number of horizontal cells, wherein the physical inventory auditor system of the present invention comprising:

a plurality of rfid tags for each cell 4 of a corresponding rack 1, each having information such as number of rack, position of the cell, product capacity and current number of stored products;

a plurality of rfid tags for each product 5, each having information such as product information and location of the product on the rack;

at least one inventory taking device 6, each comprising:
  a plurality of RFID tag reading means 7, each vertically located along a vertical support 8 and corresponding to the height of each row of the plurality of racks 1, wherein the number of RFID tags reading means corresponds to the maximum number of rows of the plurality of racks 1;
  moving means 9 for the inventory taking device, comprising a set of wheels drive by an electric motor;
  control means 10, receiving information from the RFID tag reading means 7 and sending said information to a remote information system 11 through electronic information transmission means 12 having wireless information transmission and reception means, and controlling the moving means 9 for guiding the inventory taking device 6 through a predetermined path, and further wireless receiving signals from the remote information system 11 for starting and stopping an inventory taking operation; and an electronic information and control system 11 having wireless information receiving and sending means 13, receiving information from the wireless information transmission means 12 of each inventory taking device 6 for its processing and use and sending a plurality of signals to each inventory taking device for starting or stopping an inventory taking operation.

Each of the products is provided with an RFID tag 5 which is recorded with product information and location and is stored in its respective cell 2 in such way that each new product 3 takes the place of the previous product 3 said place comprising the front of the row.

Each time a new product is added to a cell of a respective rack, the RFID tag of the respective cell 2 is recorded with the correct information about the number of products contained in the cell 2.

In the same way, each time a product 3 is subtracted from a cell 2, the RFID tag 4 of its respective cell 2 is updated with the current number of products contained in the cell 2.

In order to take the inventory of the warehouse, the electronic information and control system 11 sends a start signal to at least one of the plurality of inventory taking devices 6. When the inventory taken devices 6 receives the start signal, the control means 10 of each inventory taking device 6 sends a signal to the moving means 9 in order to start moving the device along a predetermined path, or in other embodiments of the invention, its movement may be remotely controlled by the electronic information and control system in accordance with several predetermined paths or routes. The control means 10 also activate the RFID tag reading means 7 which will start to read an RFID tag once it is sufficiently close to one.

Figure 2:
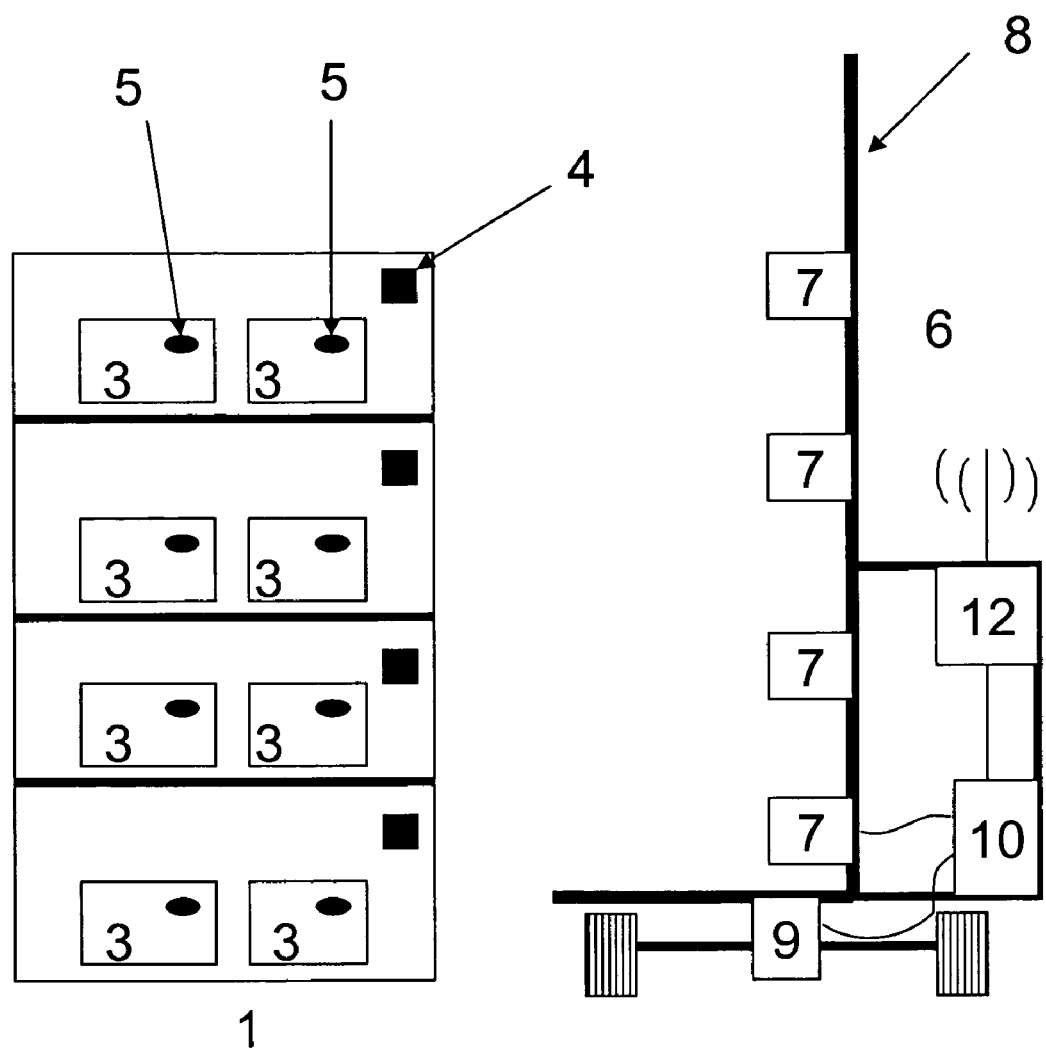
FIG. 2 is a diagram of the inventory taking system of the present invention showing a lateral representation of a rack including a plurality of products each including electronic identification means, a representation of an inventory taking device and an electronic information and control system.

The device moves along the front of each rack 1 in such way that its vertical support 8 passes in front of each rack 1 sufficiently close for the RFID tag readers 7 to detect the RFID tags of the rack 4, and products 5 as shown in FIG. 2, wherein each of the RFID tag reading means 7 are located at a height corresponding to the height of a corresponding row as previously described.

For each cell 2 of a corresponding rack 1, each RFID tag reading means 7 reads the following RFID tags in the following order: cell RFID tag 4, product RFID tag 5. The rest of the cells 2 in the same row are read by the rest of the RFID tag reading means 7. The information read by each RFID tag reading means 7 is immediately sent to the device control means 10 for its immediate sending to the electronic information and control system 11.

Once a complete column of cells is processed, the next column is immediately processed until the last column of the rack 1.

The above referred process is repeated for the next rack which may be carried out by the same device or all the racks may be simultaneously processed by other devices.

Once the device 7 or devices 7 finished the processing of all the racks 1, the whole information sent to the electronic information and control system 11 is processed and presented to the user for the immediate decision taking.

Although it was said that the moving means 9 of each inventory taking device comprises a set of wheels, it is possible that the device be moved over rails following a predetermined path.

Also, the vertical support 8 may have only one RFID tag reading means 7. In such embodiment, the vertical support 8 may comprise a telescopic elongated member which may be automatically elevated for moving the RFID tags reading means at the height of a cell 2 as needed.

As previously disclosed, the inventory taking device may be remotely controlled by the electronic information and control system 11, and in such embodiment, the whole system may be provided with the adequate related systems and devices such as a camera or position sensing means.

The system may include only one inventory taken device 8 which would be used to process all the racks one by one.

It is also possible to process only one or a selected number of racks 1 as needed if only a few number of racks have changed its status.

The electronic information and control system 11 may be running any inventory control software currently in the market which increases the versatility of the system.

In other embodiments it is possible to provide only RFID tags for each rack row or each column and each product. In such embodiment the RFID tags would contain information such as row and column capacity, current number of products etc., and each time a product is added or subtracted from the row or column the data related to the current number of products must be updated.

In the same way, it is possible to include only one RFID tag for each rack 1, and in such embodiment the RFID tag would contain all the information related to each storing position in the rack 1.

Furthermore, It also provided a method for taking inventory in warehouses having one or more product storing positions for storing a plurality of products each product having remote identification means in combination with the inventory taking system of the present invention, wherein the method comprising in its most general embodiment:

passing a remote identification means reading device near each product storing position;

obtaining information from the remote identification means of a product of each storing position including information about its storing position and;

wireless sending said information to a remote electronic information and control system;

In a preferred embodiment of the invention the method is used at a warehouse having a plurality of racks each having a plurality of rows which may be vertically divided forming cells for storing a plurality of products, each including a front and a bottom corresponding to the width of the rack, wherein each cell having an RFID tag including information such as number of rack, position of the cell, product capacity and current number of stored products, wherein each product including an RFID tag having information such as product information and location of the product on the rack and wherein the products always move from the bottom to the front, the method comprising:

passing an RFID tag reader in front of a rack;

simultaneously reading the RFID tag of each cell for obtaining information such as number of rack, position of the cell, product capacity and current number of stored products and RFID tags of the products for obtaining information such as product information and location of the product on the rack; and wireless sending the information of each cell and product to a remote information and control system, for its processing and use.

Finally it must be understood that the inventory taking system, of the present invention, is not limited exclusively to the embodiments above described and illustrated and that the persons having ordinary skill in the art can, with the teaching provided by the invention, to make modifications to the inventory taking system of the present invention, which will clearly be within of the true inventive concept and of the scope of the invention which is claimed in the following claims.

What is claimed is:

1. An inventory taking system for using in warehouses having a plurality of racks each having a plurality of rows which may be vertically divided forming cells each including a front and a bottom corresponding to the width of the rack, wherein the products always move from the bottom to the front comprising:
   a rfid tag for each cell of a corresponding rack, each having information including number of rack, position of the cell, product capacity and current number of stored products;
   a rfid tag for each product, each having information including product information and location of the product on the rack;
   at least one inventory taking device, each comprising:
   one or more RFID tag reading means, each RFID tag reading means located vertically located along a vertical support;
   moving means for the inventory taking device;
   control means, receiving information from the RFID tag reading means and sending said information to a remote information system through electronic information transmission means having wireless information transmission and reception means, and controlling the moving means for guiding the inventory taking device through a predetermined path, and further wireless receiving signals from the remote information system for starting and stopping an inventory taking operation; and
   an electronic information and control system having wireless information receiving and sending means, receiving information from the wireless information transmission means of each inventory taking device for its processing and use and sending a plurality of signals to each inventory taking device for starting or stopping the inventory taking operation,
   wherein the electronic information and control system sends a start signal to at least one of the plurality of inventory taking devices and when the inventory taking devices receive the start signal, the control means of each inventory taking device sends a signal to the moving means in order to start moving the device along a predetermined path, the inventory taking device's movement may be remotely controlled by the electronic information and control system in accordance with several predetermined paths or routes, and wherein the control means also activate the RFID tag reading means.

2. The inventory taking system of claim 1, wherein, each RFID tag reading means is located vertically located along a vertical support corresponding to the height of each row of the plurality of racks.

3. The inventory taking system of claim 2, wherein the number of RFID tag reading means correspond to the maximum number of rows of the plurality of racks.

\* \* \* \* \*